United States Patent
Kaindl

(10) Patent No.: US 6,335,602 B1
(45) Date of Patent: Jan. 1, 2002

(54) SQUEEZE PROTECTION SYSTEM

(75) Inventor: Michael Kaindl, Ergoldbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/506,447

(22) Filed: Feb. 18, 2000

(30) Foreign Application Priority Data

Feb. 18, 1999 (DE) .......................................... 199 06 705

(51) Int. Cl.⁷ ................................................. H02H 7/08
(52) U.S. Cl. ....................... 318/445; 318/446; 318/449; 318/453; 318/455; 318/459; 318/461; 318/465
(58) Field of Search ............................... 318/445, 446, 318/449, 453, 455, 459, 461, 465, 466, 468, 469

(56) References Cited

U.S. PATENT DOCUMENTS

| | | | |
|---|---|---|---|
| 6,051,945 A | * | 4/2000 | Furukawa .................... 318/280 |
| 6,054,822 A | * | 4/2000 | Harada ........................ 318/434 |
| 6,055,141 A | * | 4/2000 | Dorshcky et al. ............ 318/471 |
| 6,078,160 A | * | 6/2000 | Cilluffo ....................... 318/641 |

FOREIGN PATENT DOCUMENTS

| | | |
|---|---|---|
| DE | 196 28 203 | 1/1998 |
| DE | 197 11 979 | 10/1998 |

* cited by examiner

*Primary Examiner*—Karen Masih
(74) *Attorney, Agent, or Firm*—Crowell & Moring LLP

(57) ABSTRACT

A squeeze protection system for movable parts of a vehicle, includes an operating switch for one or several parts to be moved, one or several actuators assigned to the operating switch, a control device for the actuator or the actuators which receives a signal from the operating switch, and a device for determining an irregularity during the movement of the movable part which device is coupled with the control device. In order to ensure a secure closing of the movable part also in the event of an operating disturbance, it is provided that, when the operating switch is activated and an irregularity is detected during the movement of the movable part, the movement is first interrupted and is then continued at a higher switch-off threshold.

20 Claims, 1 Drawing Sheet

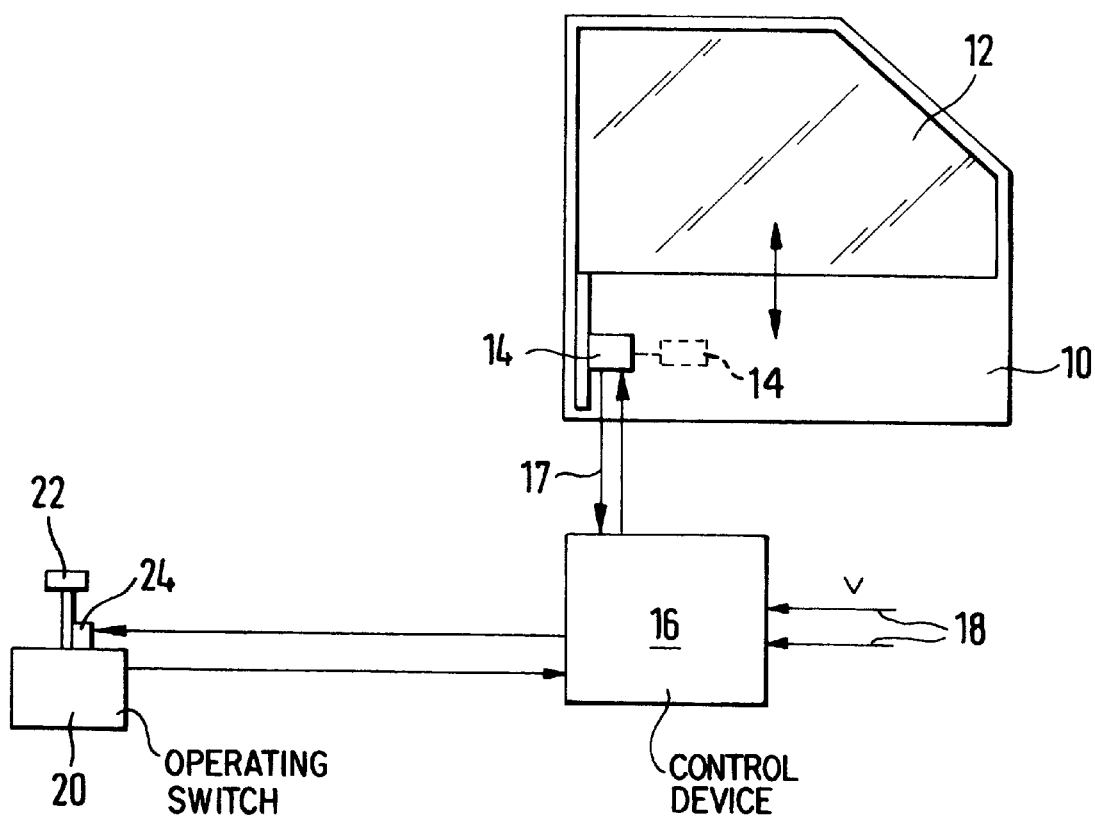

SQUEEZE PROTECTION SYSTEM

BACKGROUND AND SUMMARY OF THE INVENTION

This application claims the priority of German Patent Application DE 199 06 705.8, filed Feb. 18, 1999, the disclosure of which is expressly incorporated by reference herein.

The invention relates to a squeeze protection system for movable parts of a vehicle.

Many types of squeeze protection systems are known. For example, in the case of vehicle windows or sliding roofs, squeeze situations are detected either directly by way of a switching strip or indirectly by way of a current measurement, a pressure gauging, a rotational speed detection, etc. If such a squeeze situation exists, relays of electric drives are correspondingly controlled and the part to be moved is stopped or moved back in a certain manner.

However, the known systems have several weak points. In the event of a sluggishness or system disturbance, which exists, for example, in the case of a formation of ice, a possibility must be provided for closing a vehicle window or a sliding roof despite the sluggishness. Previous solutions which solve this problem will then switch off the squeeze protection.

Furthermore, in some countries, there is the demand for a forced closing in the event of an "attack" from the outside (panic close). Also in the case of such a panic close closing operation, the squeeze protection, as a rule, will no longer exist.

For example, when a switch for the movement of the window lift mechanism or of the sliding roof is continuously pressed, the movement is continued irrespective of the squeeze protection. On the other hand, it is known to first stop the movement of the movable part and continue it only after the operating element is operated again. Although these functionalities are explained in the operating instructions, the user is frequently not aware of them.

It is therefore an object of the invention to provide a simple squeeze protection system which overcomes the above-mentioned problems and ensures a secure closing of a part to be moved also in the event of an operating irregularity.

This object is achieved by providing a squeeze protection system for movable parts of a vehicle including an operating switch for a part to be moved, and an actuator, assigned to the operating switch, which is operable to move the part. A control device for the actuator receives a signal from the operating switch, and an irregularity determining arrangement determines an irregularity during the movement of the movable part. The irregularity determining arrangement is coupled with the control device such that, when the operating switch is activated and an irregularity is detected during the movement of the movable part, the control device is operable to first interrupt movement of the movable part and to then continue movement of the movable part at a higher switch-off threshold.

It is a characteristic which is important to the invention to first interrupt the movement when an irregularity of the movement of a part to be moved is detected and to then continue to move this part with a higher switch-off threshold. In the event of a sluggishness or system disturbance, which exists, for example, when ice has formed, the sluggishness can be overcome thereby and the movement can be continued in a functionally secure manner. In the case of a panic close operation, a possible attacker is given the chance to, for example, remove his hand out of the closing range. If he does not use this opportunity immediately, a closing will be attempted at an increasing pressure.

According to an advantageous embodiment, a maximal switch-off threshold is introduced in order to prevent a destruction of the system or a serious injury to a person.

A particularly preferred embodiment is characterized in that every time the movable part is moved along further, this movable part is slightly moved back. Specifically, as the result of this back-and-forth movement, a sluggishness can be overcome. In addition, in the event of a panic close operation, it is possible that an intruder will withdraw relatively unhindered. The above-mentioned functionality will preferably be active when an operating switch is continuously excessively pressed. In particular, the movable part reverses by only a few millimeters; that is, not, as in a normal squeeze event, by, for example, 20 cm, in order to then continue the closing movement with a slightly higher switch-off threshold. The window will therefore close jerkily but finally at the maximal force without the requirement that the operation has to be started again. In addition, the sequence of movements draws the user's attention to the presence of a disturbance.

The brief triggering times as well as the targeted controlling and increasing of the closing forces or of the torques can be implemented without difficulty by means of semiconductor elements, for example, by means of fast pole reversal operations or pulse duration modulation or linear control.

Another particularly advantageous feature of preferred embodiments is characterized in that the occurring irregularity is reported to the vehicle user, preferably acoustically, haptically or visually. As the result of this feedback, the vehicle user receives information concerning a disturbance in the movement of the movable part in addition to the jerky closing operation. Simple feedback possibilities are acoustic reports, for example, a chime, a siren or a voice output.

However, the use of feedback operating switches is particularly suitable which, in contrast to the previous systems, receive status information from the control unit or by way of a bus system—for example, from the actuator—and feed this information back to the vehicle operator. A perceivable signal can be emitted as the feedback in the operating element, for example, an acoustic, visual or haptic signal (such as a vibration). A vibration signal may increase in its intensity and/or frequency, for example, corresponding to the force generated by the actuator.

Another feedback possibility consists of reporting the condition of the actuator in that the operating force at the operating switch required for the continuation of the closing action must be increased or in that a counterforce is even actively built up. This would provide an analogy to the traditional operating crank, in the case of which the user was informed of a disturbance or squeezing by way of the operating force.

For the feedback concerning a vibration, a small actuator, such as a solenoid, an electric motor or a piezoelement, would have to the installed in the operating element, in addition to the switching element.

For a control by way of increased expenditures of force, the currently customary switching element can be replaced by pressure-sensitive sensors. For this purpose, silicium sensors, wire strain gauges, foils with semiconductor polymers, piezoelements or special contact materials (for example, conductive mixtures) are commercially available.

For a feedback in which a force is built up which is directed against the operating force, an actuator is required analogously to the vibration. Since here the rate of the counterforce is not of any decisive significance, a relatively new type of actuator technique can be used, as known, for example, from the accumulator technology in the form of adjusting units which cause a change of length during an electric charging/discharging operation. As an alternative, techniques can also be used as known from the chassis technology in the form of liquids which change their viscosity during a current conduction. What is important is not the type of feedback to the vehicle operator but that a feedback takes place at all.

By means of the above-mentioned measures, the risk of damage to persons and things can be minimized and a particularly operationally reliable squeeze protection system can be implemented. The advantage of reporting the squeezing back to the user is that, in contrast to the current method, the user receives a directly perceivable feedback concerning the situation.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a schematic illustration of a system for controlling closing of a vehicle side door window, constructed according to a preferred embodiment of the present invention.

DETAILED DESCRIPTION OF THE DRAWINGS

In the following, a particularly simple embodiment of the invention is explained in detail by means of the single drawing FIGURE. In a block diagram, the drawing shows a vehicle door 10 which comprises a window 12 which can be moved up and down (double arrow). The window 12 is driven by an electric motor 14 serving as the actuator. The electric motor 14 receives its operating signals from a control device 16 which, in turn, is informed of operating conditions 17 in the operation of the window 12, such as the rotational speed, the current consumption, etc. By sensing the operating parameters of the motor 14, the control device 16 can draw conclusions with respect to irregularities in the operation of the window 12. This will not be discussed in detail because multiple possibilities are known from the state of the art for determining irregularities by way of motor signals. In addition, the control device 16 receives input signals 18 from the outside, for example, the vehicle speed.

In the following, a particularly simple embodiment of the invention is explained in detail by means of the single drawing FIGURE. In a block diagram, the drawing shows a vehicle door 10 which comprises a window 12 which can be moved up and down (double arrow) . The window 12 is driven by at least one electric motor 14 serving as an actuator or actuators. The electric motor 14 receives its operating signals from a control device 16 which, in turn, is informed of operating conditions 17 in the operation of the window 12, such as the rotational speed, the current consumption, etc. By sensing the operating parameters of the motor 14, the control device 16 can draw conclusions with respect to irregularities in the operation of the window 12. This will not be discussed in detail because multiple possibilities are known from the state of the art for determining irregularities by way of motor signals. In addition, the control device 16 receives input signals 18 from the outside, for example, the vehicle speed.

If, during the operation of the window 12 by way of the motor 14, irregularities are determined by the control device 16, the latter generates a signal which is transmitted to an actuator 24 which is arranged at the operating switch 20. The actuator 24 generates a counterforce at the key button 22 which is haptically perceived by the vehicle operator. As the result of the continuous pressing of the key button 22, despite the feedback by way of the actuator 24, a signal continues to be supplied to the control unit 16. This control unit 16 first stops the closing operation and then continues it with an increased closing force. The stopping takes place at a defined switch-off threshold. In the present case, the window is moved back by a few millimeters and when the switch continues to be operated, the closing of the window is continued with an increased switch-off threshold. This takes place until a maximal switch-off threshold has been reached. Starting at the maximal switch-off threshold, the movement of the window 12 is then stopped completely.

The above-described embodiment provides a simple possibility of informing the driver of the irregularity or disturbance and nevertheless closing the part to be moved (for example, the window) in a manner which is as operationally reliable as possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Squeeze protection system for movable parts of a vehicle, comprising:

an operating switch for a part to be moved, an actuator assigned to the operating switch, said actuator being operable to move the part, a control device for the actuator which receives a signal from the operating switch, and an irregularity determining system for determining an irregularity during the movement of the movable part, which irregularity determining system is coupled with the control device, wherein, when the operating switch is activated and an irregularity is detected during the movement of the movable part, the control device is operable to first interrupt movement of the movable part and to then continue movement of the movable part at a higher switch-off threshold.

2. Squeeze protection system according to claim 1, wherein the movement of the movable part is definitively interrupted at a maximal switch-off threshold.

3. Squeeze protection system according to claim 1, wherein the movable part is slightly moved back before each continuation of the movement of the movable part.

4. Squeeze protection system according to claim 2, wherein the movable part is slightly moved back before each continuation of the movement of the movable part.

5. Squeeze protection system according to claim 3, wherein the moving back takes place in the range of between 1 and 7 mm.

6. Squeeze protection system according to claim 4, wherein the moving back takes place in the range of between 1 and 7 mm.

7. Squeeze protection system according to claim 1, wherein the operating switch has a feedback device which, in the case of an irregularity during the movement of the part to be moved, receives a signal from the control device and converts this signal into an acoustic, visual or haptic signal for the vehicle operator.

8. Squeeze protection system according to claim 7, wherein the feedback device is arranged at the operating switch.

9. Squeeze protection system according to claim 8, wherein a haptic feedback report takes place in the form of a vibration or of an increased force expenditure when operating the operating switch.

10. Squeeze protection system according to claim 9, wherein the feedback report takes place by means of an electric motor, a piezoelement, a solenoid or a counterforce actuator.

11. Squeeze protection system according to claim 2, wherein the operating switch has a feedback device which, in the case of an irregularity during the movement of the part to be moved, receives a signal from the control device and converts this signal into an acoustic, visual or haptic signal for the vehicle operator.

12. Squeeze protection system according to claim 3, wherein the operating switch has a feedback device which, in the case of an irregularity during the movement of the part to be moved, receives a signal from the control device and converts this signal into an acoustic, visual or haptic signal for the vehicle operator.

13. Squeeze protection system according to claim 5, wherein the operating switch has a feedback device which, in the case of an irregularity during the movement of the part to be moved, receives a signal from the control device and converts this signal into an acoustic, visual or haptic signal for the vehicle operator.

14. Squeeze protection system according to claim 1, wherein the movable part is a vehicle window.

15. Squeeze protection system according to claim 1, wherein the movable part is a sun roof part.

16. Squeeze protection system according to claim 5, wherein the movable part is a vehicle window.

17. Squeeze protection system according to claim 7, wherein the movable part is a vehicle window.

18. Squeeze protection system for movable parts of a vehicle, having an operating switch for one or several parts to be moved, at least one actuator assigned to the operating switch, a control device for the at least one actuator which receives a signal from the operating switch, and having a device for determining an irregularity during the movement of the movable part which device is coupled with the control device, wherein, when the operating switch is activated and an irregularity is detected during the movement of the movable part, the movement of the movable part is first interrupted and is then continued at a higher switch-off threshold.

19. Method of operating a vehicle window closing system which includes:

a manually operable operating switch, a motorized actuator 14 operable to move a window between open and closed positions, and a control device operable to control the actuator in response to signals from the operating switch and to signals representing window closing irregularity, said method including automatically controlling the actuator by the control device such that operating with an activated operating switch and an irregularity detected in the window closing path the window closing movement is first interrupted and then resumed at a higher closing force level.

20. Method according to claim 19, wherein the window is moved slightly in an opening direction after the first interruption and before resumption of closing movement at the higher closing force level.

* * * * *